US008122812B2

(12) United States Patent
Herwig

(10) Patent No.: US 8,122,812 B2
(45) Date of Patent: Feb. 28, 2012

(54) PISTON AND CYLINDER UNIT

(75) Inventor: Karl-Wilhelm Herwig, Meinhard (DE)

(73) Assignee: Pacoma GmbH, Eschwege (DE)

( * ) Notice: Subject to any disclaimer, the term of this patent is extended or adjusted under 35 U.S.C. 154(b) by 793 days.

(21) Appl. No.: 12/188,296

(22) Filed: Aug. 8, 2008

(65) Prior Publication Data

US 2009/0038472 A1 Feb. 12, 2009

(30) Foreign Application Priority Data

Aug. 10, 2007 (DE) ......................... 10 2007 037 760

(51) Int. Cl.
*F16J 1/12* (2006.01)

(52) U.S. Cl. ......................................... 92/255; 403/299

(58) Field of Classification Search .................... 92/255; 403/299

See application file for complete search history.

(56) References Cited

U.S. PATENT DOCUMENTS

| | | | | |
|---|---|---|---|---|
| 1,362,435 | A | 12/1920 | Neraas | |
| 3,293,993 | A | 12/1966 | Lanman | |
| 3,885,461 | A | 5/1975 | Crisp et al. | |
| 6,126,355 | A * | 10/2000 | Clover | 403/299 |
| 6,837,144 | B2 | 1/2005 | Herwig | |

FOREIGN PATENT DOCUMENTS

| | | |
|---|---|---|
| DE | 821 444 | 10/1951 |
| DE | 24 48 019 | 4/1975 |
| DE | 101 56 504 C1 | 4/2003 |
| FR | 2232234 | 12/1974 |
| FR | 2 718 504 A1 | 10/1995 |
| GB | 1013689 | 12/1965 |
| GB | 1134300 | 11/1968 |

* cited by examiner

*Primary Examiner* — Daniel Lopez
(74) *Attorney, Agent, or Firm* — Thomas, Kayden, Horstemeyer & Risley, LLP

(57) ABSTRACT

A piston and cylinder unit (1) includes a cylinder housing (2), a piston (7), a piston rod (18) and a securing element (20). The piston (7) includes an opening (13), at least one piston seal (11) and an inner thread (15) being located in the opening (13). The piston rod (18) has an axis (9) and includes a protrusion (21), an outer thread (23) and a second thread (27). The outer thread (23) is located on the protrusion (21). The second thread (27) is located at the piston rod (18). The piston (7) and the piston rod (18) are connected by the inner thread (15) and the outer thread (23). The securing element (20) is designed and arranged to substantially extend in the direction of the axis (9). The securing element (20) includes a thread (24), the securing element (20) and the piston rod (18) being connected by the thread (24) of the securing element (20) and the second thread (27) of the piston rod (18). The securing element (20) is designed and arranged to be active in an axial direction in a way to prevent rotational movement of the piston (7) in a loosening direction. The threads (15, 23) of the piston (7) and of the piston rod (18) are designed and arranged to be operated in a direction opposite to the threads (24, 27) of the securing element (20) and the piston rod (21).

11 Claims, 6 Drawing Sheets

PISTON AND CYLINDER UNIT

CROSS REFERENCE TO RELATED APPLICATIONS

This application claims priority to co-pending German Patent Application No. DE 10 2007 037 760.8 entitled “Kolben/Zylinder-Einheit mit einem Zylindergehäuse, einem Kolben und einer Kolbenstange”, filed Aug. 10, 2007.

FIELD OF THE INVENTION

The present invention generally relates to a piston and cylinder unit. More particularly, the present invention relates to a piston and cylinder unit including a cylinder housing, a piston, a piston rod and a securing element.

BACKGROUND OF THE INVENTION

A piston and cylinder unit is known from German patent number DE 101 56 504 C1 corresponding to U.S. Pat. No. 6,837,144 B2. The known piston and cylinder unit includes a cylinder housing, a piston including an opening and a piston rod having a common axis. The piston includes a piston seal and a guiding element. The piston with its inner thread being located in the opening is connected to the outer thread of a protrusion of the piston rod without an increased tightening moment. The inner thread of the piston and the outer thread of the piston rod are arranged to have the same eccentricity with respect to the respective axes of the piston and of the piston rod. The piston is screwed on the piston rod at such an angle end position that the axes of the piston and of the piston rod are aligned. The eccentricity is used to prevent unintended rotational movement without requiring additional securing elements. This means that the fixed arrangement of the piston advantageously only requires a few components and thus can be produced at low costs. It is not even necessary to arrange engagement surfaces for a rotational tool at the piston since the piston can be screwed in both directions by hand. Increased tightening moments are not used such that it is also not necessary to harden the faces of the piston and of the piston rod. The known piston connection has a short structural length and thus makes it possible that the full length of the piston rod can be used.

Furthermore, it is also known in the art to fixedly connect a piston in a piston and cylinder unit, the piston having an opening and being designed to be continuous in an axial direction and not to include a thread. The piston is pushed over a protrusion of the piston rod. The protrusion of the piston rod includes an outer thread onto which a securing nut is screwed after having slipped on the piston. The securing nut has an opening and an associated inner thread. For example, the securing nut includes an insert made of plastic serving as securing element against a rotational movement in the loosening direction. In this way, a non-positive securing effect against undesired rotation is attained.

It is also known in the art to combine a piston and a securing nut to one single part such that the associated inner thread is arranged in an opening of the piston. A stud being arranged in the piston in a radial direction is used as a securing element, the stud in the mounted position pressing against the protrusion of the piston rod. The known piston has to include a respective engagement surface for a rotational tool to be capable of applying the required high tightening moment during assembly and the respective high loosening moment during disassembly. Usually, it is necessary to use special tools for this purpose.

Both above described known arrangements for fixing a piston using a high tightening moment have the following drawbacks: It is not possible to apply the high moments during assembly and disassembly without special tools. The piston or an additional securing element has to include respective engagement surfaces for the special tool. Additional components for preventing unintended rotational movement are required, and they lead to the structural length in the region of the piston being increased. The front surfaces of the piston and of the piston rod substantially extend in a radial direction. They contact each other and thus need to be hardened in a comparatively complicated way. Such piston connections are complicated in manufacture, and they are not easy to be serviced.

In case it is required to arrange a static seal between the piston and the piston rod, the piston and the piston rod are designed and arranged such that there is an overlap in an axial direction to an extent required for arranging the static seal. In this way, the surface of the piston rod, which has anyway been accurately processed, maybe used as the counter surface for the static seal.

Another piston and cylinder unit is known from U.S. Pat. No. 3,293,993. The known piston and cylinder unit includes a cylinder housing, a piston having an axis and a piston rod having an axis. The piston includes an opening including an inner thread with which it is connected to an outer thread being located on a protrusion of the piston rod. The piston is screwed onto the thread of the protrusion of the piston rod with a high tightening moment such that there are high pulling forces in this part of the piston rod. The axes of the threads and the axes of the piston rod and of the piston coincide. The known piston and cylinder unit does not teach any means for preventing rotational movement of the piston with respect to the piston rod, and it also does not disclose a design which is safe and easy to be serviced.

A piston arrangement for a fluid motor is known from German patent application number DE 24 48 019 corresponding to U.S. Pat. No. 3,885,461. The known piston and cylinder unit includes a cylinder housing, a piston including an opening and a piston rod. The piston includes an opening including an inner thread which is screwed onto and tightened to an outer thread of a protrusion of the piston rod with a high tightening moment such that an edge of the piston “bites” into a diminishing section of the piston rod. A locking nut is located on another section of the protrusion in a way that it contacts the piston under pressure. The threads of the locking nut and of the additional section of the protrusion of the piston rod are less declined and have a greater number of threads than the threads of the piston and of the section of the piston rod being connected thereto. All threads are designed to be rotated in the same direction. In this way, rotational forces during operation which usually lead to loosening effects now act in a way that the locking nut and the piston are tightened even closer in a direction towards one another.

To design the arrangement of the piston in a way to make it easier to be serviced, another piston and cylinder unit is known in the art. The piston and the piston rod are loosely screwed on each other by a threaded connection including an inner thread and an outer thread. It is important in this known connection that any rotation of the piston with respect to the piston rod is prevented. The connection is attained without applying a tightening moment. The means for preventing rotation is designed as a bolt, a bush and the like, which protrudes into an axial bore. The bore is arranged in a way that it protrudes through the threaded portion between the piston rod and the piston. Chips are produced during assembly. These chips result in undesired soiling. The bush, the bolt or the like additionally has to be secured against an axial movement. Usually, this is achieved by a screw including a securing disk, the screw protruding through the piston in an axial direction and which forms a stop for the movement of the bush, the bolt or the like. This known fixed arrangement of the piston includes a comparatively great number of components serving to prevent rotational movement. Due to the design and arrangement of the elements, the structural length in the region of the connection of the piston and of the piston rod is comparatively great. Fixing the piston is complicated and causes high costs due to the need for manufacturing these elements. However, it is advantageous in this known piston arrangement that no high tightening moment is to be used such that the piston connection is easy to be repaired since, after having removed the securing means, the piston can be loosened by a comparatively easy rotation of the piston rod.

SUMMARY OF THE INVENTION

The present invention relates to a piston and cylinder unit. The piston and cylinder unit includes a cylinder housing, a piston, a piston rod and a securing element. The piston includes an opening, at least one piston seal and an inner thread being located in the opening. The piston rod has an axis and includes a protrusion, an outer thread and a second thread. The outer thread is located on the protrusion. The second thread is located at the piston rod, meaning on or in the piston. The piston and the piston rod are connected by the inner thread and the outer thread. The securing element is designed and arranged to substantially extend in the direction of the axis. The securing element includes a thread, the securing element and the piston rod being connected by the thread of the securing element and the second thread of the piston rod. The securing element is designed and arranged to be active in an axial direction in a way to prevent rotational movement of the piston in a loosening direction. The inner thread of the piston and the outer thread of the piston rod are designed and arranged to be operated in a direction opposite to the thread of the securing element and the second thread of the piston rod.

The novel piston and cylinder unit can be mounted without having to apply a high tightening moment. This makes it possible to mount and dismount the piston and cylinder unit by hand. The required means for preventing undesired rotational movement of the piston which has been screwed on the piston rod is realized in a different way compared to the prior art. The new design is inexpensive and easy to be serviced.

Usually, the piston and cylinder unit in addition to the cylinder housing includes a guiding bush in which the piston rod of the piston and cylinder unit is guided and supported. In addition to its dynamic piston seal, the piston usually includes a guiding element and a static seal. The piston rod may end in a bearing eye with which it is connected to be commonly rotated therewith. The cylinder housing also includes a bearing, for example a bearing eye. The piston is connected to the end of the piston rod being movably arranged in the cylinder housing.

When it is required to replace seals and/or guiding elements of the piston, it is only necessary to loosen the guiding bush with respect to the cylinder housing and to pull out the piston rod with the piston connected thereto from the cylinder housing. If however guiding elements, seals and/or stripping elements being associated with the piston rod and usually being arranged in the guiding bush have to be replaced, it is necessary to loosen the piston with respect to the piston rod to make the inner opening of the guiding bush accessible.

The detachable connection of the piston to the piston rod is an elementary problem for piston and cylinder units. The detachable connection has to be designed such that the piston is capable of accepting the axial forces produced by the fluid and of transmitting these forces to the piston rod. Furthermore, it is often necessary to seal the fluid between the piston and the piston rod. In case there is a threaded connection between the piston and the piston rod, it is necessary to prevent rotation of the piston with respect to the piston rod to prevent unintentional automatic loosening of the piston under operational loads.

One generally differentiates pretensioned (or prestressed, pre-loaded) connections from non-pretensioned connections in the art. In pretensioned connections, a tightening moment is applied by the threaded connection such that the piston and the piston rod are firmly pressed against one another in the mounted position. Usually, it is necessary to harden the faces of the piston and the piston rod to fulfill the limits of the allowable surface pressure when the required high tightening moments are applied. Such a high tightening moment has substantial advantages during operation of the piston and cylinder unit since the piston is only exposed to pulsating stress and the axial force caused by the tightening moment always remains greater than the axial force caused by the fluid. The tightening moment is the first safety measure of the piston against loosening during operational conditions. In addition, often a second securing means is used. However, in case of replacement of the seal and/or the guiding elements associated with the piston rod, detaching a piston from a piston rod which has been mounted with a great tightening moment is a substantial problem. This especially applies if one imagines that such a piston and cylinder unit may be, for example, part of a construction machine, an excavator and the like, which needs to be repaired afield without being capable of using the facilities of a normal garage.

The present invention is based on the concept of arranging a securing element on or in the protrusion of the piston rod in addition to the piston. The securing element substantially extends in the direction of the axis of the piston and cylinder unit and serves to prevent rotation of the piston in a loosening direction by being active in an axial direction. The securing element also includes a thread, and it extends with its axis to be coaxial to the common axis of the piston and cylinder unit and of the piston rod, respectively. The pair of threads connecting the piston and the piston rod, on the one hand, and the pair of threads connecting the securing element and the piston rod, on the other hand, are designed to be operated in opposite directions, meaning one of the pair of threads is designed as a right-handed threaded connection and the other pair of threads is designed as a left-handed threaded connection. The piston and the securing element contact one another by surfaces which transmit forces due to friction. In this way, rotation of a thread of the first pair of threads in the loosening direction is associated with rotation of a thread of the second pair of threads in the tightening direction. In this way, the beginning loosening rotation of one element, for example the piston, results in the securing element being rotated in the tightening direction due to the contact surface to the securing element.

The new way of securing the piston on or in the piston rod is in contrast to the known fixing by a locknut of a screw connection in which, for example, two nuts are screwed on one common thread of a screw. The nuts are rotated on the common thread in opposite directions. In this way, one produces tension in the screw which increases the pretensional forces in a way that the frictional forces occurring at the flanks of the threads counteract loosening of the screw connection. It is disadvantageous in this known way of securing that the component to be secured, namely the nut which has been first screwed onto the screw, has to be screwed backwards on the thread of the screw which results which results in the securing contact of the first nut at a collar of the screw getting lost.

The new way of securing the piston on the piston rod is in contrast to the developments known in the prior art, especially the development using high tightening moments for connecting the piston by screwing with a wrench. Leaving this concept allows for simplified assembly and disassembly of the unit. The piston and the securing element only need to be mounted by screwing with a tightening moment which is in a normal range such that it is possible without problem to connect the piston and/or the securing element to the piston rod by hand without using tools. Thus, the piston may be easily removed from the piston rod outdoors, for example, when it is necessary to replace the seals in a guiding bush of the piston rod.

The new way of securing the piston also makes it possible to use greater diameters in the region of the threads compared to the prior art. The fact that no great tightening moments are used results in there being no great surface pressure as in the prior art such that the diameter of the outer thread at the protrusion which serves to contact the inner thread of the piston is only slightly smaller than the outer diameter of the piston rod. Preferably, the dimensions are chosen in a way that the diameter of the outer thread does not interfere with inserting the piston rod into a guiding element such that the seal located at that place is not damaged. Realizing greater diameters increases the bearing percentage of the pair of threads connecting the piston and the piston rod such that is it possible to use materials of a lower quality for the piston rod and for the piston. It is also possible that the thread has a comparatively shorter length. This has a positive effect on the structural length of the piston and cylinder unit. Furthermore, no special measures have to be taken, as, for example, hardening respective surfaces at the piston rod and the piston as it was required for accepting high tightening moments in the prior art. The pair of threads acting between the piston and the piston rod may also be produced by simple producing methods, for example, by thread cutting instead of rolling. This simplifies small batch productions for which manufacturing and using a rolling tool would be too expensive. It is also possible to produce the thread to have a comparatively greater pitch. Due to the fact that the piston can be connected by screwing by hand, no special engagement surfaces for a torsional wrench have to be arranged at the piston. Such engagement surfaces are necessarily required for applying high tightening moments. Another advantage is the comparatively small structural length of the cylinder since the piston is constructed to be shorter and the arrangement of the securing element being active in an axial direction does not necessarily increase the structural length. In case the securing element is designed as a nut, the engagement surface of the nut has to be accessible which results in a slight increase of the structural length. However, if the securing element acting in an axial direction is designed as a screw, there is the possibility of designing such a screw, for example, a hexagon socket screw, without increasing the structural length of the piston and cylinder unit.

Additionally, the securing element which is active in an axial direction may include a securing means against a rotational movement in the loosening direction. This securing means is associated with the securing element, but not with the piston. The securing means always relates to the securing element. All kinds of securing means as they are used for preventing screws and nuts from rotating in the loosening direction may be used. For example, this may be a radially arranged threaded pin, a special design of the supporting surfaces, a bendable securing disk or an added respective securing material located in the thread. The securing means for the securing element is always designed to be detachable to allow for simplified disassembly of the securing element and of the piston.

The piston includes a stop surface which is active in an axial direction, and the securing element includes a counter stop surface being active in an axial direction. The stop surface and the counter stop surface contact one another under friction. In this way, it is ensured that a loosening movement of one element in the loosening direction is associated with a tightening movement of the other element in the tightening direction.

A static seal may be arranged between the piston and the piston rod. However, the seal may also be located at a different place. The static seal increases static friction of the piston at the piston rod.

The securing element which is active in an axial direction substantially extends in the direction of the common axis of the piston and cylinder unit and it can be moved and rotated, respectively, by a screwing movement. The securing element which is active in an axial direction usually is designed as a nut or as a screw the axes of which are arranged to be coaxial to the common axis of the piston and cylinder unit.

There are different constructive possibilities of realizing the securing means for the securing element. One possibility is a stub being supported in the piston, being arranged in a radial direction and engaging the actuation surface of the securing element. It is to be understood that the securing means, meaning, for example, the stud, first needs to be loosened during disassembly to be capable of rotating the securing element in the loosening direction. When the securing element has been removed from the protrusion of the piston rod by screwing, the piston can be easily rotated and removed on its opposite thread by hand without having to apply substantial forces.

The inner thread of the piston and the associated outer thread of the protrusion may have a pitch in a region of approximately between 1 mm and 5 mm. All kinds of threads known in the prior art may be used for this, especially threads having a great pitch and a small structural length.

Usually, the piston is mounted and disassembled by screwing by hand. Preferably, the securing element is connected by screwing with a moment in a region of approximately between 20 Nm and 50 Nm against the piston. Such moments may be realized by hand without having to use special tools.

The piston and the securing element may be arranged in a way that they at least partly overlap in an axial direction to extend the structural length only as much as necessary. This especially applies to the design of the securing element as a nut. When the securing element is designed as a screw, the screw may even be located within the structural length of the piston such that there is no increase of the structural length at all. Especially, the screw may be designed as a hexagon socket screw.

The threads by which the piston is connected to the piston rod and by which the securing element is connected to the piston rod by screwing are designed and arranged to be opposite threads. Preferably, the piston and the piston rod are connected by a left-handed thread and the securing element and the piston rod are connected by a right-handed thread. This simplifies availability of a securing element and handling since a user, for example, when detaching the securing element, expects a normal right-handed thread. However, the arrangement may also be vice versa.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
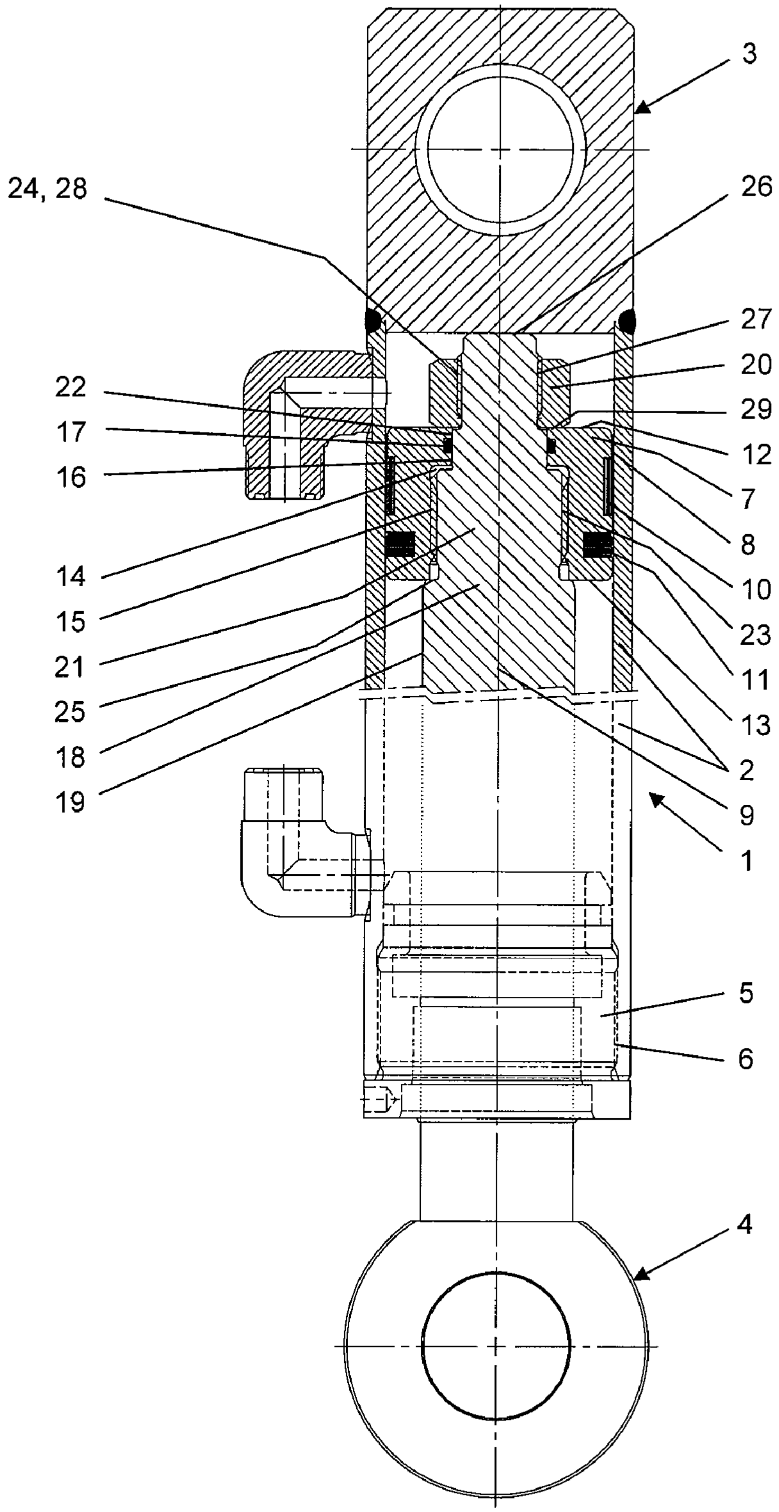
FIG. 1 is a sectional view through a first exemplary embodiment of the novel piston and cylinder unit.

The novel piston and cylinder unit 1 illustrated in FIG. 1 includes a cylinder housing 2 having a tubular design and at its one end being connected to a bearing 3. A bearing 4 is arranged at the other end of the piston and cylinder unit 1. A guiding bush 5 being connected to the cylinder housing 2 by a thread is located at the side of the cylinder housing 2 facing the bearing 4. The guiding bush 5 is connected to the cylinder housing 2 by a thread 6.

A piston 7 is slidingly and sealingly arranged in the cylinder housing 2 in a way to be movable. The piston 7 has an outer surface 8 which is designed to be cylindrical. The piston 7 has an axis 9 which is arranged to be concentric to the surface 8 and to coincide with the axes of the piston and cylinder unit 1. Elements for guiding and sealing are arranged on the outer surface 8 of the piston 7. In this case, these elements are a guiding band 10 and a dynamic seal 11. The piston 7 has a first stop surface 12 and a second stop surface 13. The piston 7 includes an opening 14 which in this case has a stepped design. A part of the stepped opening 14 includes an inner thread 15 while another part of the stepped opening 14 is designed as a cylindrical bore 16. A static seal 17 is arranged in the region of the cylindrical bore 16. The opening 14 with its inner thread 15 and the bore 16 with its seal 17 are arranged to be centric with respect to the common axis 9 of the piston and cylinder unit 1.

The piston and cylinder unit 1 includes a piston rod 18 having an outer diameter 19 forming the outer circumference of the piston rod 18. The piston rod 18 at its end facing the piston 7 includes a protrusion 21. The protrusion 21 is also designed to be stepped to be coordinated with the opening 14. A part of the protrusion 21 has a cylindrical outer surface 22. Another part of the protrusion 21 includes an outer thread 23 corresponding to the inner thread 15. The protrusion 21 has a collar 25 which is contacted by the stop surface 13 of the piston 7 when connecting it by screwing. The part of the stop surface 13 and of the collar 25 which get in contact with each other may be designed to be comparatively small since there is no high surface pressure. In this way, the outer thread 23 of the protrusion 21 may be realized at a great diameter in an advantageous way.

The piston rod 18 is slidingly and sealingly guided within the guiding bush 5. For this purpose, different elements are located in the guiding bush 5. The piston rod 18 at its end facing away from the piston 7 includes the bearing 4 by which an implement and the like is connected to the piston and cylinder unit 1. The protrusion 21 at its end protruding through the piston 7 includes a stop surface 26 which is supported at a front wall of the cylinder housing 2 in a starting position. In this position, a force acting upon the piston rod 18 is directly introduced into the cylinder housing 2 and its bearing 3, respectively, without being introduced into the piston 7. The piston and cylinder unit 1 at this place is designed to be double acting, meaning in a way that the pressure chambers being formed at both sides of the piston 7 can each be subjected by a fluid, especially a hydraulic fluid. This is realized by a respective control valve as it is generally known in the art. However, the novel piston and cylinder unit 1 may also be designed to be single acting (see FIG. 6).

A securing element 20 is associated with the piston 7. In this case, the securing element 20 is designed as a nut. The securing element 20 includes an opening 28 including an inner thread 24. The protrusion 21 includes a part having a smaller diameter and being coordinated to match the securing element 20. An outer thread 27 is arranged on the smaller part, the outer thread 27 corresponding to the inner thread 24 of the securing element 20. The securing element 20 has a counter stop surface 29 by which the securing element 20 contacts the stop surface 12 of the piston 7. The stop surface 12 and the counter stop surface 29 are designed in a way that they frictionally engage one another, meaning they transmit friction.

The pair of threads 15, 23 connecting the piston 7 and the protrusion 21 is designed to be operated in an opposite direction compared to the pair of threads 24, 27 connecting the securing element 20 and the protrusion 21. For example, the pair of threads 15, 23 may be designed as left-handed threads and the pair of threads 24, 27 may be designed as usual right-handed threads.

At the beginning of assembly of the piston and cylinder unit 1, the elements are mounted at the guiding bush 5. In the following, the piston rod 18 is inserted through the guiding bush 5, the static seal 17 is inserted and the piston 7 is connected by screwing. Before connecting the piston 7 by screwing, the piston 7 is preassembled with the guiding band 10 and the seals 11 and 17. Screwing may be realized manually (meaning by hand) since it is only necessary to overcome respective low frictional forces. During this screwing process, the piston 7 with its second stop surface 13 contacts the collar 25 of the piston rod 18 such that the surface pressure at the collar 25 is respectively low. The contact surface at the collar 25 may be chosen and constructed to be comparatively small such that a comparative great diameter at the threads 15, 23 may be realized in an advantageous way. The threads 15, 23 may be designed to be shorter compared to the prior art which has an advantageous effect with respect to the small structural length of the novel piston and cylinder unit 1. When designing the threads 15, 23 as left-handed threads, there is a respective screwing motion.

In the following, the securing element 20 is connected by screwing. Due to the fact that the pairs of threads are designed to be operated in opposite directions, the screwing motion is realized clockwise. This screwing process may also be realized by hand. The screwing process is completed by the stop surface 12 of the securing element 20 contacting the counter stop surface 29 of the piston 7. There is frictional contact at these surfaces 12, 29 which results in the securing effect. If the piston 7 during operation of the piston and cylinder unit 1 shows the tendency of rotating in the opening direction, this leads to the securing element 20 being moved in the tightening direction due to friction such that the securing effect is maintained.

Next, the preassembled unit including the piston rod 18, the piston 7 connected by screwing and the securing element 20 connected by screwing is inserted into the cylinder housing 2. Then, the guiding bush 5 is screwed into the cylinder housing 2 by means of the thread 6, and it is fixed at that place. Thus, the piston and cylinder unit 1 is assembled and ready to be used. In case of defects occurring during or after operation of the piston and cylinder unit 1, for example leakage, disassembly is realized in the opposite order such that all sealing elements which may need to be replaced are easily made accessible. Consequently, the novel piston and cylinder unit 1 is designed such that it is easy to repair it and to service it.

Figure 2:
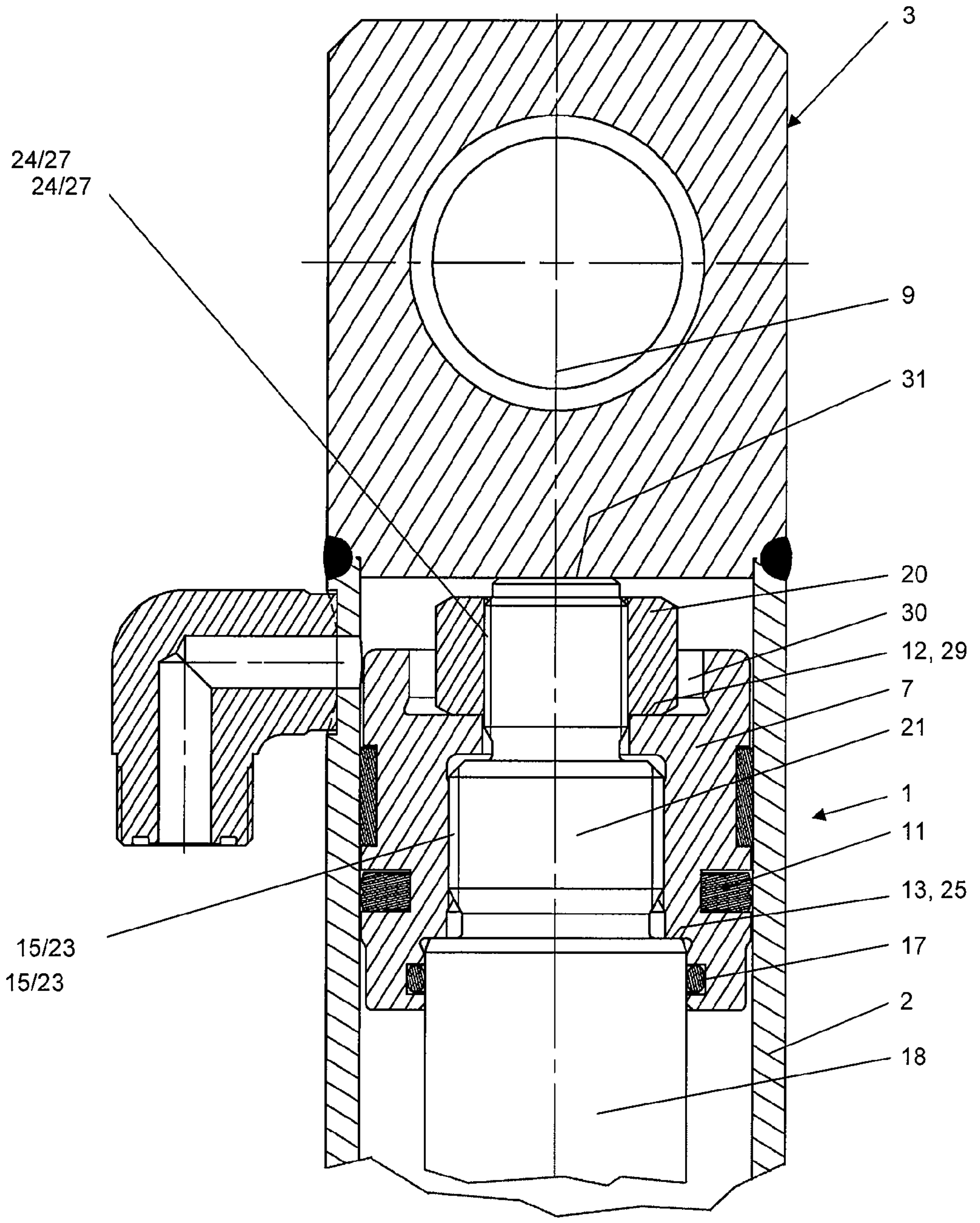
FIG. 2 is a sectional view through a second exemplary embodiment of the novel piston and cylinder unit.

FIG. 2 illustrated another exemplary embodiment of the novel piston and cylinder unit 1. The piston 7 is connected to the piston rod 18 in a similar way as it has been described with respect to the embodiment of the piston and cylinder unit 1 illustrated in FIG. 1. Again, the parts include threads 15, 23 and 24, 27 which rotate in opposite directions. Other constructive details are similar to the once described above such that it is referred to the above description. The piston 7 at its end facing the bearing 3 includes an opening 30 the axial length of which is chosen such that is accommodates a part of the securing element 20. The securing element 20 is also designed as a nut. However, the securing element 20 may also be fully located within the axial length of the piston 7. In this case, the opening 30 has to be dimensioned such that the nut can be reached and operated, for example, by a socket wrench. The axial lengths of the piston 7 and the securing element 20 partly or completely overlap, which has a positive effect with respect to the total structural length of the piston and cylinder unit 1. It is to be understood that the stop surface 12 and the counter stop surface 29 are formed at respective locations in the piston 7. The place of arrangement of the static seal 17 has also been changed. There is no counter collar at the protrusion 21 which cooperates with the static seal 17. Instead, the precisely processed surface of the piston rod 18 is used as the counter surface for the seal 17. It is to been seen that the part of the protrusion 21 facing the bearing 3 protrudes out off the securing element 20. It has a short design such that it only minimally elongates the structural length. It is the intension of such a design to support forces in the piston rod 18 directly in the bearing 3 via a stop 31 being located at its free end. The novel piston and cylinder unit 1 according to FIG. 2 is also designed as a double acting unit. Respective supply lines leading to the respective active chambers are to be seen in FIG. 2.

Figure 3:
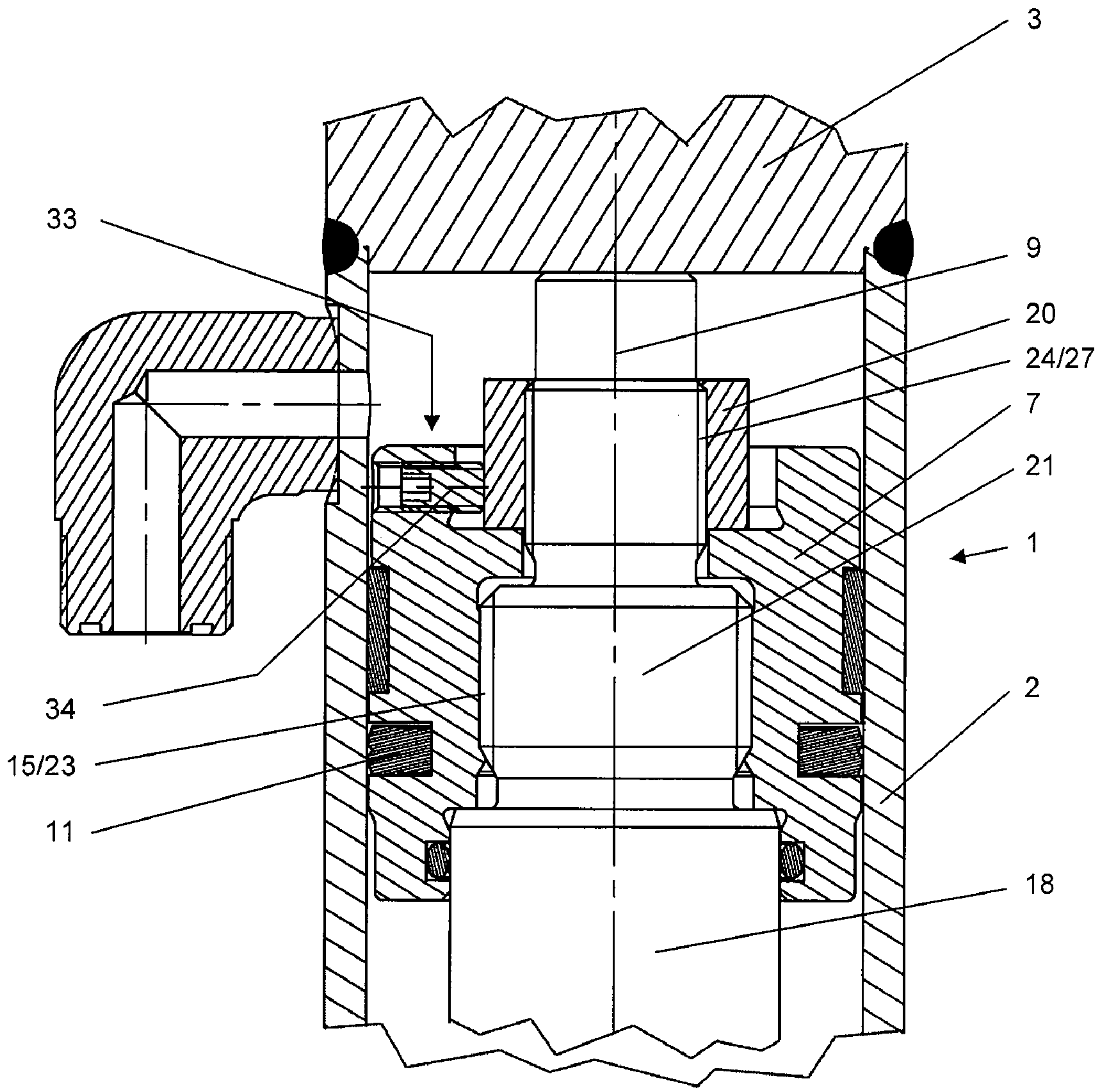
FIG. 3 is a sectional view through a third exemplary embodiment of the novel piston and cylinder unit.

The exemplary embodiment of the novel piston and cylinder unit 1 according to FIG. 3 has a lot of features in common with the embodiment illustrated in FIG. 2. In addition to the threads being designed to be rotated in opposite directions, a securing unit 33 is associated with the securing element 20. The securing unit 33 includes a stud 34 being arranged in the piston 7 to be radial with respect to the common axis 5. After assembly of the piston 7 and the securing element 20 by the threads 15, 23 and 24, 27 (which are designed to be rotated in opposite directions) at the protrusion 21 of the piston rod 18, the stud 34 is fixed by screwing such that it radially contacts a surface at the securing element 20. For example, this may be a wrench engagement surface of a usual nut. With this securing unit 33, the securing element 20 itself is additionally secured against rotation in the loosing direction.

It is also possible to design the securing unit 33 for the securing element 20 in a different way, as this is generally known in connection with screws and nuts to be prevented from unintended rotational movement in the loosening direction, meaning especially cotters, safety screws, washers and the like.

Figure 4:
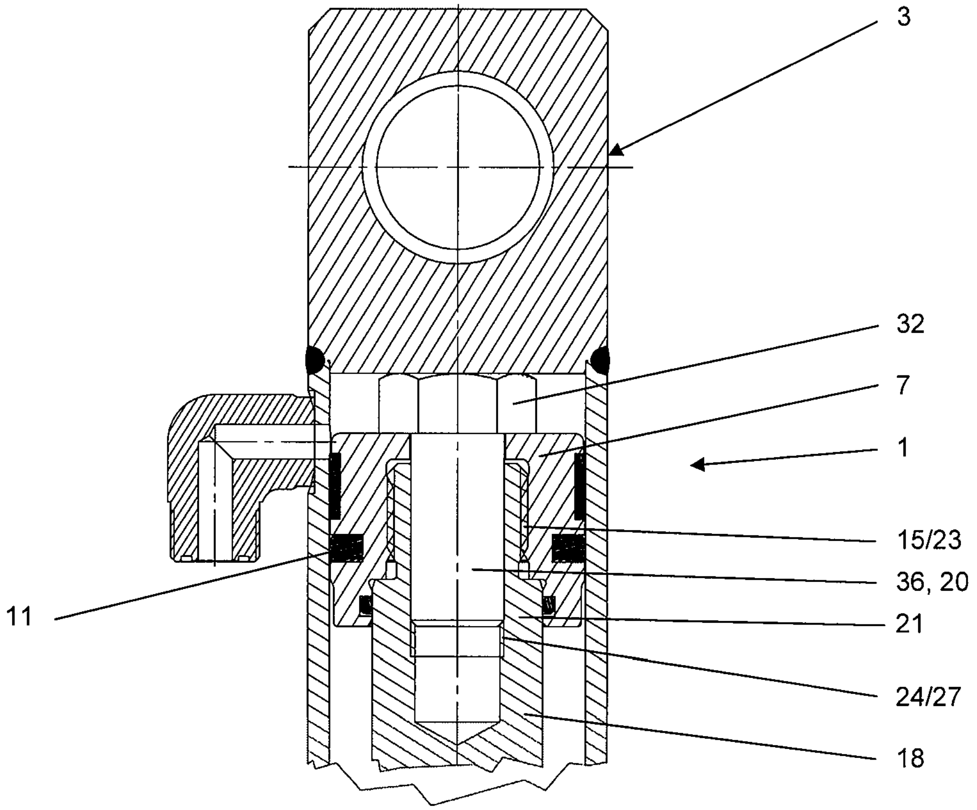
FIG. 4 is a sectional view through a fourth exemplary embodiment of the novel piston and cylinder unit.

The embodiment of the novel piston and cylinder unit 1 illustrated in FIG. 4 has many features in common with the above described embodiments. The securing element 20 is designed as a hexagon screw 36 with its shank extending into the interior of the piston rod 18 such that the structural length determined by the piston 7 is only increased by the head 32 of the hexagon screw 36. One again, the threads 15, 23 and 24, 27 are designed and arranged to be rotated in opposite directions.

Figure 5:
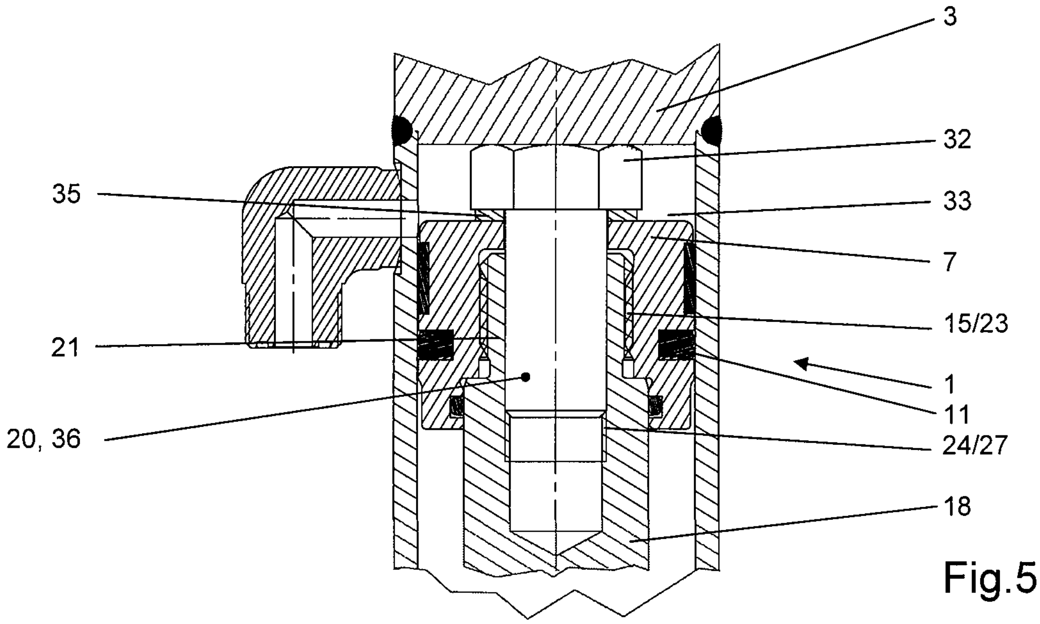
FIG. 5 is a sectional view through a fifth exemplary embodiment of the novel piston and cylinder unit.

The exemplary embodiment of the novel piston and cylinder unit 1 according to FIG. 5 has many features in common with the one illustrated in FIG. 4. In addition, a securing unit 33 is associated with the securing element 20, the securing unit 33 serving to prevent rotational movement in the loosening direction. The securing element 33 includes a securing disk 35. However, it is also possible to realize the securing unit 33 in a different way, for example as a locking element, as a resilient element using friction, as a locking element with positive engagement or as a mass to be applied to the thread.

Figure 6:
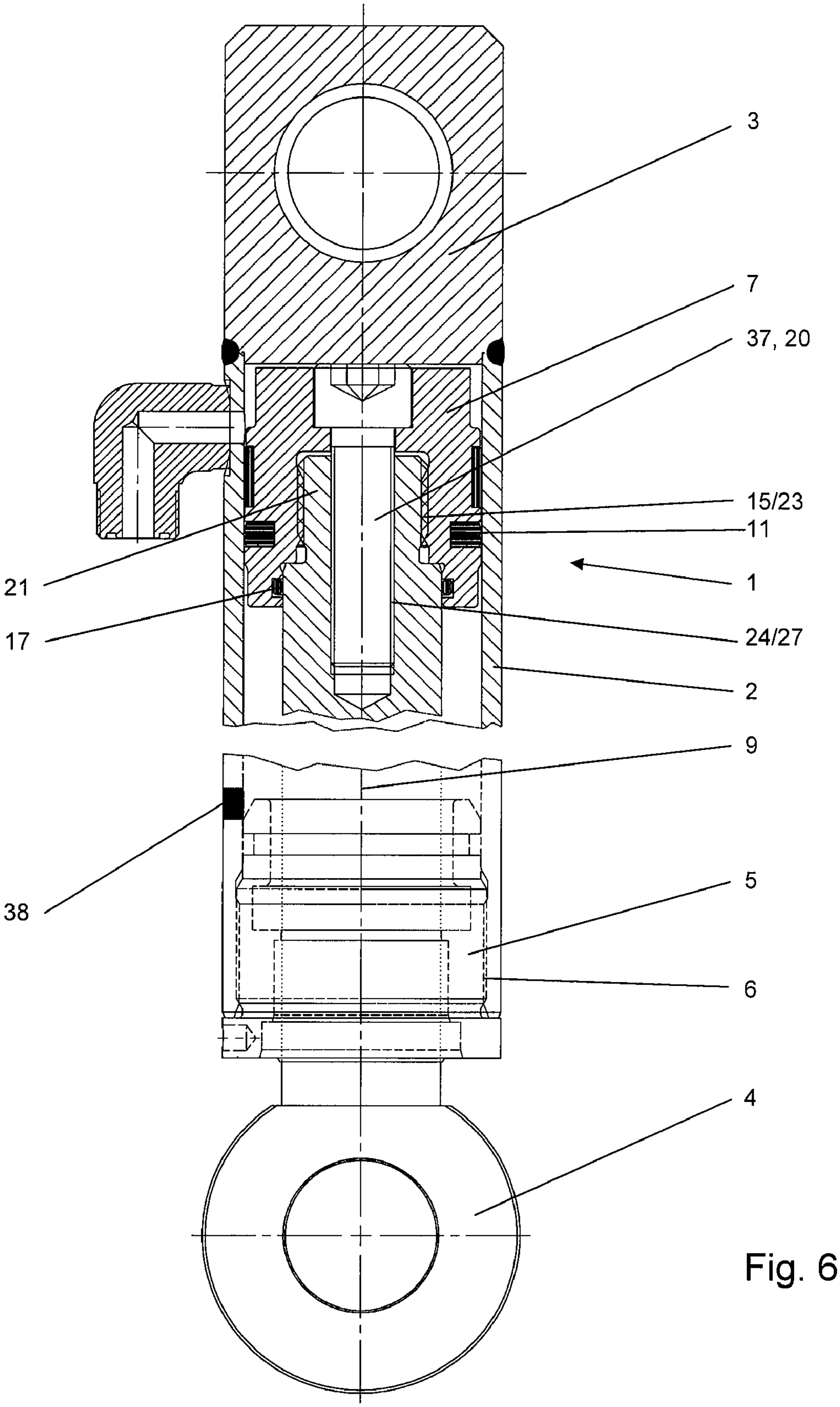
FIG. 6 is a sectional view through a sixth exemplary embodiment of the novel piston and cylinder unit.

The embodiment of the novel piston and cylinder unit illustrated in FIG. 6 also uses a screw as the securing element 20. In this case, the screw is a hexagon socket screw 37. The securing unit 33 is designed as a securing means in the form of glue applied to the threads 24, 27. This embodiment of the novel piston and cylinder unit 1 results in a very short structural length since the hexagon socket screw 37 can be arranged within the extension of the screw 7. The embodiment according to FIG. 6 also shows that the invention may be also applied to single acting piston and cylinder units 1. Ventilation of the chamber surrounding the piston rod 18 is realized by a bore 38.

Figure 7:
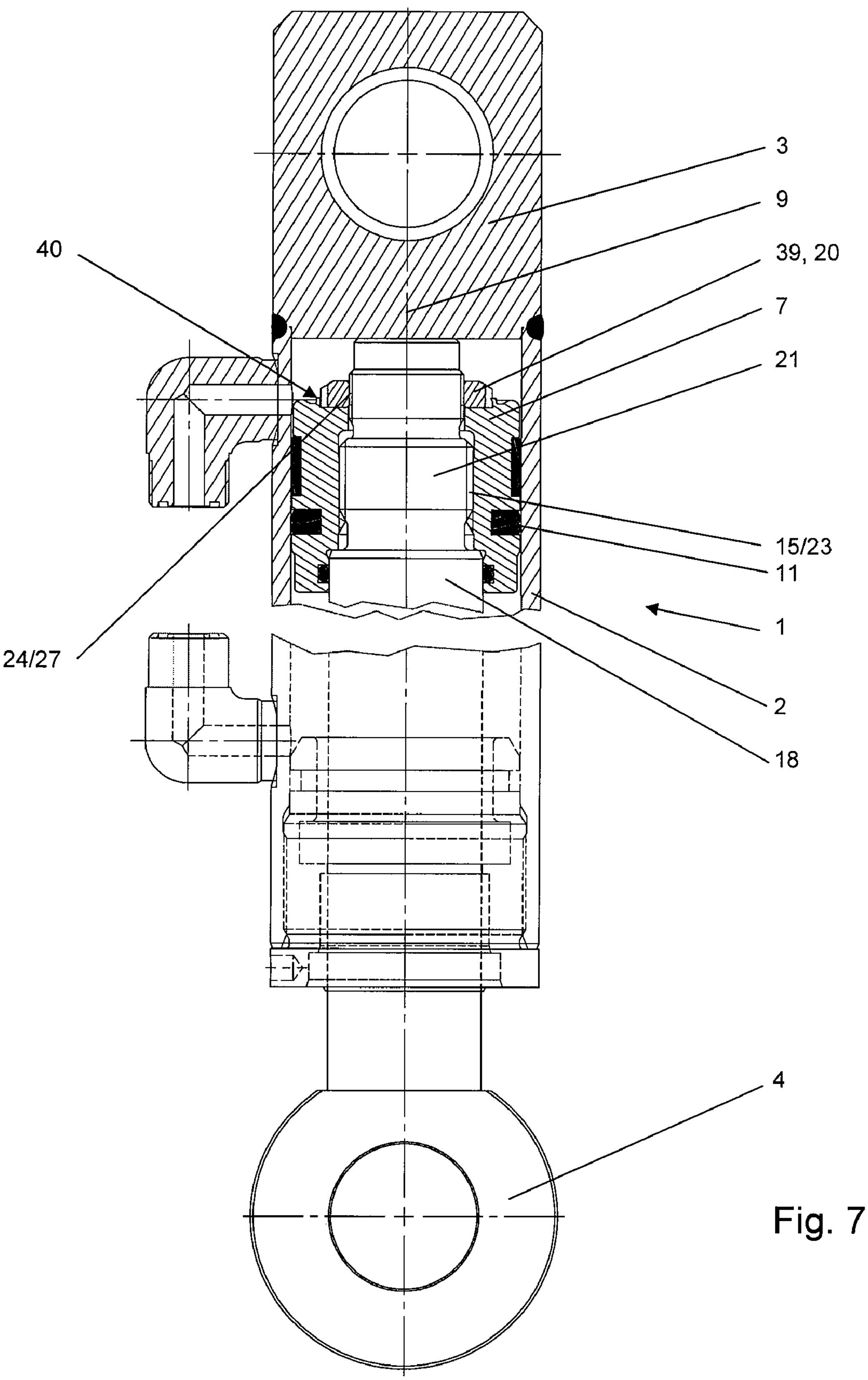
FIG. 7 is a sectional view through a seventh exemplary embodiment of the novel piston and cylinder unit.

The exemplary embodiment of the novel piston and cylinder unit 1 illustrated in FIG. 7 uses a groove nut 39 as the securing element 20, the groove nut 39 being fastened by caulking 40.

Many variations and modifications may be made to the preferred embodiments of the invention without departing substantially from the spirit and principles of the invention. All such modifications and variations are intended to be included herein within the scope of the present invention, as defined by the following claims.

I claim:

1. A piston and cylinder unit, comprising:

a cylinder housing;

a piston, said piston including an opening, at least one piston seal and an inner thread, said inner thread being located in said opening;

a piston rod, said piston rod having an axis and including a protrusion, an outer thread and a second thread, said outer thread being located on said protrusion, said piston and said piston rod being connected by said inner thread and said outer thread;

a securing element, said securing element being designed and arranged to substantially extend in the direction of the axis, said securing element including a thread, said securing element and said piston rod being connected by said thread of said securing element and said second thread of said piston rod, said securing element being designed and arranged to be active in an axial direction in a way to prevent rotational movement of said piston in a loosening direction, said inner thread of said piston and said outer thread of said piston rod being designed and arranged to be operated in a direction opposite to said thread of said securing element and said second thread of said piston rod, said securing element including a securing means against rotation in a loosening direction, said securing means including a stud, said stud being arranged in said piston to extend in a radial direction, said securing element including an actuation surface, said stud being connective to said actuation surface.

2. The piston and cylinder unit of claim 1, wherein said securing element (20) is screwed against said piston (7) with a moment of approximately between 20 Nm to 50 Nm.

3. The piston and cylinder unit of claim 1, wherein said piston includes a stop surface being effective in an axial direction and said securing element includes a counter stop surface being effective in an axial direction.

4. The piston and cylinder unit of claim 1, wherein said securing element is designed as a nut.

5. The piston and cylinder unit of claim 1, wherein said securing element is designed as a screw.

6. The piston and cylinder unit of claim 1, wherein said inner thread of said piston and said associated outer thread of said protrusion have a pitch of approximately between 1 mm and 5 mm.

7. The piston and cylinder unit of claim 1, wherein said piston and said securing element are arranged to at least partly overlap in an axial direction.

8. The piston and cylinder unit of claim 1, wherein said piston and said piston rod are connected by said inner thread and said outer thread being designed as left-handed threads and said securing element and said piston rod are connected by said thread of said securing element and said second thread being designed as right-handed threads.

9. The piston and cylinder unit of claim 1, wherein said piston and said piston rod are connected by said inner thread and said outer thread being designed as right-handed threads and said securing element and said piston rod are connected by said thread of said securing element and said second thread being designed as left-handed threads.

10. The piston and cylinder unit of claim 1, wherein a static seal is arranged between said piston and said piston rod.

11. A piston and cylinder unit, comprising:

a cylinder housing;

a piston, said piston including an opening, at least one piston seal and an inner thread, said inner thread being located in said opening;

a piston rod, said piston rod having an axis and including a protrusion, an outer thread and a second thread, said outer thread being located on said protrusion, said second thread being located at said piston rod, said piston and said piston rod being connected by said inner thread and said outer thread;

a securing element, said securing element being designed and arranged to substantially extend in the direction of the axis, said securing element including a thread, said securing element and said piston rod being connected by said thread of said securing element and said second thread of said piston rod, said securing element being designed and arranged to be active in an axial direction in a way to prevent rotational movement of said piston in a loosening direction, said inner thread of said piston and said outer thread of said piston rod being designed and arranged to be operated in a direction opposite to said thread of said securing element and said second thread of said piston rod, said securing element being designed as a groove nut, said groove nut being fastened by caulking.

* * * * *